United States Patent
Aliaga et al.

(10) Patent No.: US 10,266,247 B2
(45) Date of Patent: Apr. 23, 2019

(54) PROTECTIVE MAT FOR LEADING EDGES OF AIRFOIL ELEMENTS

(71) Applicants: Airbus SAS, Blagnac (FR); AIRBUS HELICOPTERS, Marignane (FR)

(72) Inventors: Daniel Aliaga, Suresnes (FR);
Marie-Paule Guillou, Suresnes (FR);
Elisa Campazzi, Suresnes (FR);
Thomas Navarre, Paris (FR)

(73) Assignees: Airbus SAS, Blagnac (FR); Airbus Helicopters, Marignane (FR)

( * ) Notice: Subject to any disclaimer, the term of this patent is extended or adjusted under 35 U.S.C. 154(b) by 469 days.

(21) Appl. No.: 14/634,730

(22) Filed: Feb. 28, 2015

(65) Prior Publication Data

US 2016/0009369 A1    Jan. 14, 2016

(30) Foreign Application Priority Data

Mar. 3, 2014   (EP) .................................... 14305298

(51) Int. Cl.
*B64C 3/26*     (2006.01)
*F01D 5/14*     (2006.01)
(Continued)

(52) U.S. Cl.
CPC .............. *B64C 3/26* (2013.01); *B64C 11/205* (2013.01); *B64C 27/473* (2013.01); *F01D 5/147* (2013.01);
(Continued)

(58) Field of Classification Search
CPC ....... B64C 3/26; B64C 11/205; B64C 27/473; B64C 41/003; B64C 65/002; B64C 3/36; B64C 2700/6283; B64C 2027/4733;
F01D 5/147; F01D 5/28; F01D 5/005; F01D 5/286; F01D 5/142; F01D 5/14; F01D 5/145; F01D 5/282; F01D 5/288; F05D 2250/70; B64D 2045/009; B29C 65/5078; B29C 65/55; B29C 65/54; B29C 67/0048; B29C 70/06
(Continued)

(56) References Cited

U.S. PATENT DOCUMENTS 5,144,113 A    9/1992   Hall et al.
5,542,820 A *  8/1996   Eaton .................... B64C 27/473
                                                        416/224
(Continued)

FOREIGN PATENT DOCUMENTS

EP   2196393 A1   6/2010
FR   2639608 A1   6/1990

OTHER PUBLICATIONS

Calvert, et al.; Aerodynamic Impacts of Helicopter Blade Erosion Coatings, Jun. 2012; AIAA 2012-2914; TR 95-D-8; U. S. Army Aviation and Missile Research, Development and Engineering Command.*

*Primary Examiner* — Christopher Verdier
(74) *Attorney, Agent, or Firm* — Greer, Burns & Crain Ltd.

(57) ABSTRACT

A device for protecting an airfoil element made of a complex comprising a polymer film, a metal strip deposited on a part of the polymer film and an adhesive element to attach the polymer film on the airfoil element. The polymer film forms a protection against sand abrasion. The metal strip forms a protection against water abrasion of the airfoil element on which the complex is attached.

20 Claims, 2 Drawing Sheets

(51) Int. Cl.
 *F01D 5/28* (2006.01)
 *B64C 11/20* (2006.01)
 *B64D 45/00* (2006.01)
 *B64C 27/473* (2006.01)

(52) U.S. Cl.
 CPC ............... *F01D 5/28* (2013.01); *F01D 5/288* (2013.01); *B64D 2045/009* (2013.01); *Y02T 50/671* (2013.01); *Y02T 50/673* (2013.01)

(58) Field of Classification Search
 USPC ...... 416/224, 241 A, 62, 229 R, 229 A, 230; 29/402.09, 402.02; 118/71; 428/539.5
 See application file for complete search history.

(56) References Cited

U.S. PATENT DOCUMENTS

| | | | |
|---|---|---|---|
| 7,780,419 B1* | 8/2010 | Matheny | F01D 5/005 416/221 |
| 8,091,227 B2* | 1/2012 | Hong | B23P 6/007 29/402.18 |
| 2004/0118978 A1 | 6/2004 | Anning | |
| 2010/0000066 A1 | 1/2010 | Boissy | |
| 2010/0008788 A1* | 1/2010 | Barbee | F01D 5/288 416/224 |
| 2010/0028160 A1* | 2/2010 | Schaeffer | F01D 5/005 416/224 |
| 2010/0233501 A1* | 9/2010 | Messer | B23K 9/232 428/586 |
| 2015/0132140 A1* | 5/2015 | Haag | F03D 1/0675 416/224 |
| 2016/0222978 A1* | 8/2016 | Drozdenko | F01D 5/147 |

* cited by examiner

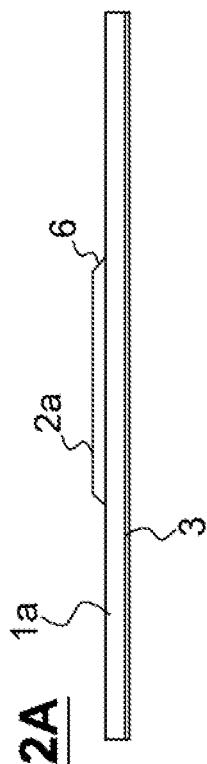
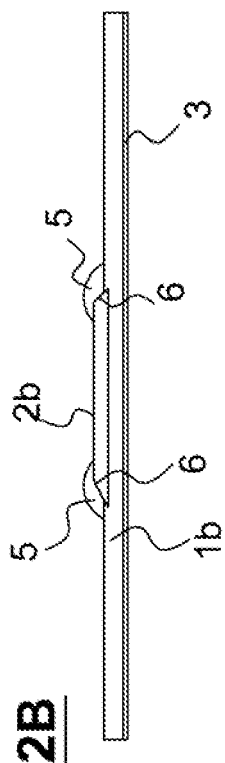
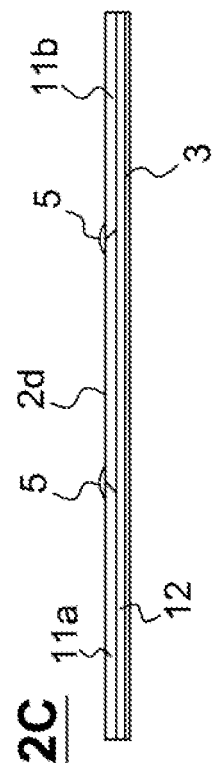
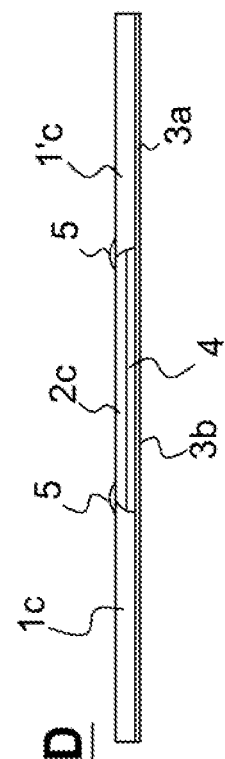
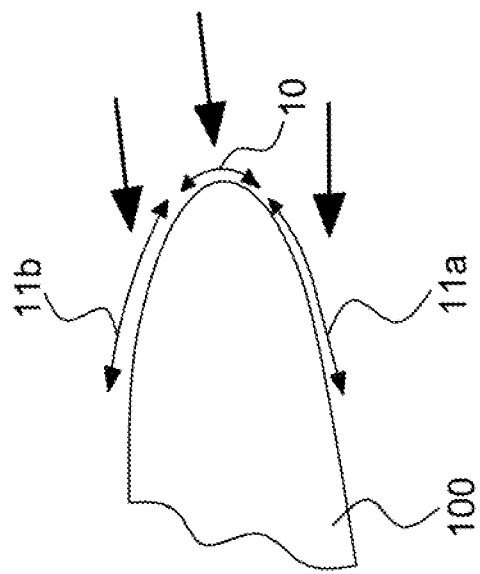

PROTECTIVE MAT FOR LEADING EDGES OF AIRFOIL ELEMENTS

FIELD OF THE INVENTION

The present invention relates to a protective device for aeronautical structures such as the leading edges of airfoil elements and in particular the leading edges of helicopter blades.

The main subject of the invention is a protective ply for leading edges of aircraft airfoil elements and in particular a metallic/polymer adhesive protective ply, maintaining the aerodynamic profile of the parts protected and offering protection of this profile in particular in terms of erosion resistance both against attacks of solid particles (sand erosion) and liquid particles (rain erosion).

TECHNICAL BACKGROUND

Erosion is a major problem on aircraft, especially for the leading edges of the airfoil elements. The protective systems known for these zones are divided into two types:

Metallic coatings: caps made of titanium, steel or other metal alloys of Ni/Co type have a good resistance to rain erosion, but are rapidly eroded by sand.

Highly ductile organic coatings, in the form of adhesive films based on essentially polyurethane elastomer, have a good resistance to sand erosion but their durability remains rather unsatisfactory. These films are used, on the one hand, as temporary protection on the metal cap of blades for helicopters subjected to sand erosion and, on the other hand, as longer-lasting protection in the vicinity of the blade root. When they are not used near the root, they do not however withstand rain conditions.

In particular, it turns out that if an aircraft equipped with films for protection against sand erosion passes through a storm, these films are completely deteriorated in around 15 minutes.

The main problem is therefore the absence of an effective solution for protection against sand erosion that is capable of sufficiently withstanding rain erosion in order not to be changed too often, yet more and more users are requesting to be able to fly over all terrains and in all weather conditions.

Protection that combines resistance to sand erosion and rain erosion would in particular enable military vehicles to be suitable for missions in demanding environments and in particular that combine the problems of desert and tropical environments.

BRIEF DESCRIPTION OF THE INVENTION

The objective of the present invention is to propose a sand protection device that is easy to use and that withstands the rain.

The solution proposed by the present invention comprises a airfoil element protection device consisting of a complex comprising a polymer film, a metal strip deposited on a portion of the polymer film and a means for bonding the polymer film to said airfoil element, said polymer film forming an element for protection against sand erosion and the metal strip forming an element for protection against water erosion of the airfoil element to which the device is bonded.

The complex is advantageously hollow-shaped so as to fit the profile of a airfoil element leading edge. The forming operation is in particular a thermoforming operation and the polymer is selected consequently.

Since the airfoil element comprises areas of low incidence and areas of high incidence, the polymer film is advantageously shaped so as to cover one or more areas of low incidence of the airfoil element, the metal strip being shaped in order to cover an area of high incidence of said airfoil element.

According to a first embodiment, the metal strip is bonded to the polymer film.

According to a second embodiment, the metal strip is welded to the polymer film.

According to a third embodiment, the metal strip is embedded in the polymer film.

Advantageously, the metal strip is embedded by hot application to the polymer film.

According to a fourth embodiment, the metal strip comprises a base to be bonded to the airfoil element, sheets of the polymer film being positioned on either side of the metal strip.

According to a fifth embodiment, the polymer film consists of a lower sheet on which the metal strip is laid and of two upper sheets joined together with the lower sheet on either side of the metal strip.

Advantageously, a sealing varnish covers an interface area between the metal strip and the polymer film.

Preferably, the edges of the metal strip extended by the polymer film are bevelled edges.

The invention also relates to a airfoil element protection system comprising a device of the invention, for which the protection device is accompanied by an assembly jig and forms with this jig a kit that can be adapted outside of the factory.

The invention furthermore relates to a helicopter blade covered with a device of the invention, for which the metal strip covers a leading edge of the blade while the polymer film covers a lower surface portion and an upper surface portion of the blade around the leading edge.

BRIEF DESCRIPTION OF THE DRAWINGS

Other features and advantages of the invention will become apparent on reading the following description of a nonlimiting exemplary embodiment of the invention with reference to the drawings that represent:

in FIGS. 2A to 2D: side views of embodiment variants of devices of the invention prior to their application on a wing element;

in FIG. 4: a schematic cross-sectional view of a leading edge of a blade.

DETAILED DESCRIPTION OF EMBODIMENTS OF THE INVENTION

As mentioned above, the polyurethane films used nowadays for protection in the vicinity of the blade root or as temporary protection against sand erosion have the drawback of deteriorating very rapidly in rain.

The system currently used for the temporary protection of blades equipped against sand erosion with no deicing system is a polyurethane adhesive film having a width of 610 to 1220 mm and having a length adapted to the length of the blade, having a surface density of 432 to 590 g/m² and positioned on the leading edge of the blades.

Figure 1:
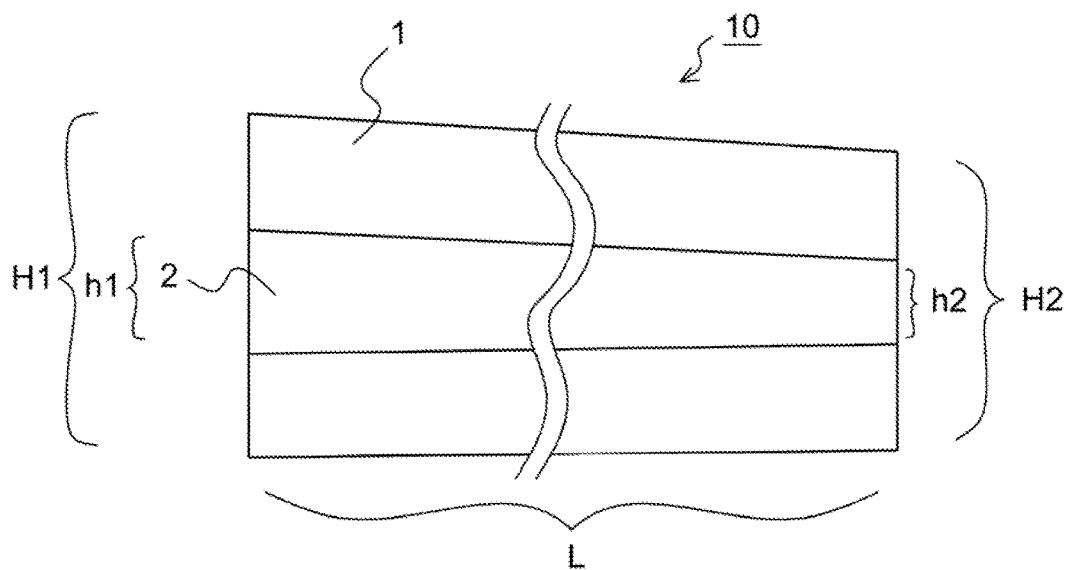
in FIG. 1: a front view of an exemplary embodiment of a device of the invention.

The present invention proposes a solution capable of slowing down the degradation due to water erosion of the plastic films used for sand erosion and FIG. 1 represents a device for sand and rain protection of a airfoil element according to the invention, seen from above.

The device comprises a polymer film 1 for protection against sand erosion that is intended to cover one or more areas of low incidence of the airfoil element and a metal strip 2 for protection against water erosion that covers an area of high incidence of said airfoil element.

The solution described in the present invention is a metal strip/polymer film hybrid ply. The idea is to have the polymer film alone in line with the areas subjected to sand erosion, areas of low incidence and to protect this film with a thin metal strip in line with the areas subjected to water erosion, areas of high incidence. Indeed, it is in line with these areas that the detachments and damages that rapidly degrade the temporary sand protection initiate.

FIG. 4 represents a leading edge of a blade 100 with the area of normal incidence at the profile 10 or of high incidence which is an area of rain erosion and the areas of low incidence 11a, 11b which are the areas of sand erosion.

The use of adhesive films having specific properties that respond to the needs over localized areas makes it possible to provide new performances or to increase existing performances while offering a lasting solution via the easy replacement of the film.

The complex comprising a polymer film 1 and a metal strip 2 is, according to FIG. 1, designed to follow the profile of a blade and from this perspective the film comprises, according to the example represented, a width H1 on the root side that is greater than its width H2 on the blade tip side. Similarly, the metal strip 2 sees, according to this example, its width h be reduced from h1 to h2 in the same manner.

The complex has a length L that is at least sufficient to cover a blade length equivalent to the blade length covered by the film from the prior art.

For the production of the complex, various solutions are possible and they generally comprise a multilayer stack comprising an adhesive, a polymer film, in particular of PEEK, PEI or preferably PU, having a thickness of between 50 and 350 μm and preferably of the order of 200 μm; a metal strip of aluminium, titanium, preferably steel and more particularly AISI 301 grade steel having a thickness of between 20 and 150 μm, preferably 50 μm.

According to FIG. 2A, the strip 2a is at the surface of the film 1a and an adhesive may be used to bond the metal strip to the polymer film if necessary.

This adhesive may be avoided for certain polymer films or in the case of processes comprising, for example, hot deposition of the metal strip on the polymer film, which results in a slight sinking of the strip into the film as represented in FIG. 2B where the strip 2b sinks into the film 1b.

Production variants are possible.

FIG. 2C provides a strip 2d bonded to a lower film 12 while two films 11a and 11b are bonded to the first one on either side of the strip. In this embodiment, the strip and the film sheets are designed to avoid an overthickness of the strip with respect to the film.

In these three solutions, an adhesive film 3 covers the lower face of the polymer film (face opposite the one that receives the metal strip).

FIG. 2D represents an embodiment for which two film sheets 1c, 1c' are laid on either side of a metal strip deposited on a substrate 4, the juxtaposed sheets and substrate being bonded to the airfoil element.

In this case, it is possible that the lower surface of the two polymer film elements 11a, 11b is covered with a first adhesive film 3a while the substrate 4 is covered with a second adhesive film 3b.

In all cases, a sealing varnish 5 may cover the interface area between the metal strip and the polymer film to prevent the wind, drops of water or sand from blowing into the interface between the metal strip and the film and running the risk of degrading or detaching the latter.

Likewise, in order to avoid having a break in the slope at this interface, the longitudinal edges of the metal strip are, according to the examples represented, bevelled edges 6, the cutting angle of which makes it possible to smooth the transition between the strip and the film.

The metal strip is sized so as to cover only the area most subjected to water erosion, that is to say the end of the leading edge on which the incidence of the raindrops is close to the normal to the tangent of the leading edge. In order to do this, the strip covers a band 2 to 10 cm wide around the tip of the leading edge.

In the lower surface and upper surface areas of the blade extending the leading edge, the metal strip is replaced by the polymer film since in these areas of low incidence water no longer represents a danger for the surfaces covered with the film when the erosion due to grains of sand that scratch the surface of the blades becomes predominant. The mixed metal/polymer film solution of the invention is designed to be suitable for the types of attacks that are predominant depending on the areas in question of the blades or wing elements.

The invention may be applied to all helicopters and may cover various areas of the blades, in particular the areas covered by a metal cap on helicopters subjected to sand erosion or the areas closer to the blade root that are nowadays protected by a polymer film.

Figure 3:
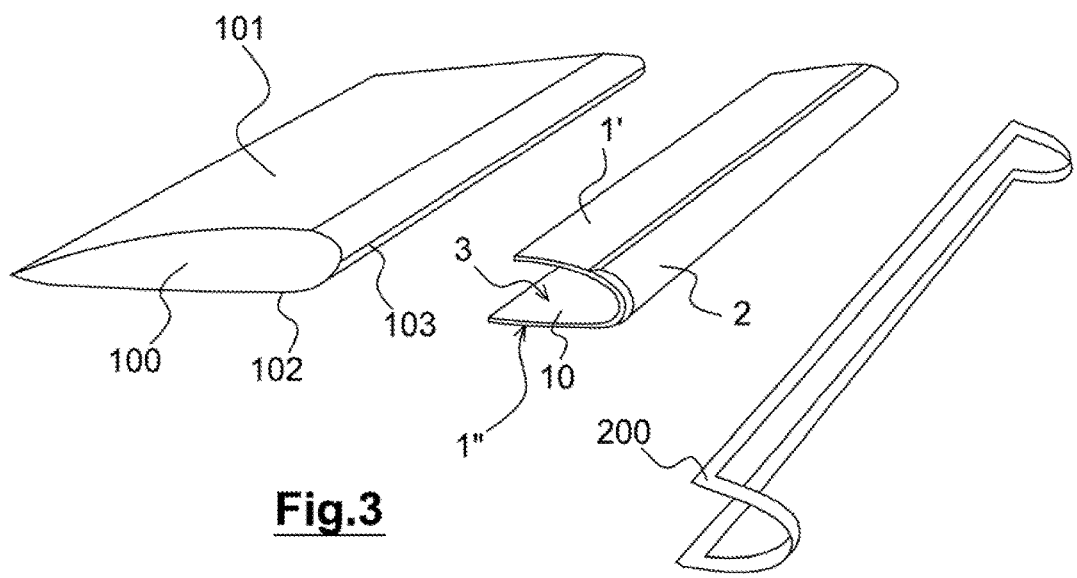
in FIG. 3: a perspective view of an exemplary embodiment of the invention that is applied to a helicopter blade.

FIG. 3 represents an embodiment of the device of the invention for which the complex 10 is semi-rigid and preformed in order to fit the profile of the blade 100 so that the portions 1' and 1" of the polymer film are positioned respectively on the upper surface 101 and the lower surface 102 of the blade 100 while the portion of polymer film covered by the strip 2 is positioned on the optionally metallic leading edge 103 of the blade.

The forming of the polymer film may in particular, for the materials chosen, be carried out by thermoforming in a heated mould. The metal strip is, in such case, preferably put in place before the thermoforming operation and is then in contact with a convex shape of the mould.

The face of the film in contact with the airfoil element may also, in this case, be covered by a means 3 for bonding the device to the airfoil element, such as an adhesive film.

In such a case, the protection device is optionally accompanied by an assembly jig 200 that is positioned on the blade, in the case of a helicopter blade for example, in order to delimit the location of the device, the device then forming, with this jig, a kit that can be adapted outside of the factory, for example outside on an operations field of the helicopter.

The solution described in the present invention, which may be in kit form, is easy to install and replace by the users, has a competitive price, is capable of prolonging the service life of the temporary protection, even if the aircraft is brought to fly in mixed meteorological conditions.

Furthermore, the advantage of an adhesive solution, also available as a kit, is to reduce the downtime of the aircraft and above all to make it possible to carry out the maintenance of this solution in difficult environments, in particular basic hangers or in the open air.

The materials combined in order to produce the "metal strip/polymer film" hybrid solution are:

a metal strip: this is a stainless steel of AISI 301 or 1.4310 type which is highly work-hardened and supplied in the form of a strip having a thickness of 20 to 100 µm, but preferably close to 50 µm in order to offer a good durability/mass compromise;

a polymer film made of one or more sheets: this is a polyurethane film. Since the role of this part of the protection is essentially devoted to protecting against sand erosion, formulations closest to the reference formulation, that is known to perform well under these conditions, will be taken as a starting point. The thicknesses could vary between 50 and 300 µm, but a thickness of the order of 200 µm, which also offers an acceptable durability/mass compromise, will be preferred;

an adhesive of around 50 µm for bonding the ply to the airfoil element that is compatible with the materials to be assembled and that ensures both a good stability of the interfaces and an ease of removal of the protection for the replacement thereof.

The results currently available such as erosion tests carried out with means for spraying drops of water on a 50 µm 1.43010 steel strip+200 µm PU film multilayer stack according to the invention in comparison with a current PU protection having a thickness of the order of 300 µm show that the current sand protection does not withstand 100 impacts of drops of water at 180 m/s while the complex of the invention resists more than 10 000 impacts at the speed of 250 m/s, the two solutions remaining equivalent as regards the sand protection despite the reduction in thickness of the polymer film that is enabled according to the invention by the addition of the metal band.

In the case of a thermoformed film, the manufacture of the device comprises:

a step of cutting the polymer film, a step of cutting the strip, a step of applying the strip to the polymer film, a step of positioning the polymer film+strip assembly in a thermoforming heated mould and a step of thermoforming the device in the shape of the airfoil element to be covered, then a step of applying a film of adhesive to the face of the polymer film intended to be applied against the airfoil element and finally a conditioning step.

For the application of the strip to the polymer film, provision may be made for either a bonding step or a flat heating step or for optionally using the thermoforming heating step to simultaneously bond and embed the strip in the polymer film.

An important aspect of the invention is that the device remains at least equivalent to the prior solution in terms of effectiveness and mass and that it is longer lasting, which reduces the number of protection replacement operations for equivalent flight conditions.

The invention claimed is:

1. An airfoil element protection device, comprising:
a complex comprising a polymer film, a metal strip deposited on a portion of the polymer film, and an adhesive element to bond the polymer film to an airfoil element,
wherein the polymer film forms a protection against sand erosion and the metal strip forms a protection against water erosion of the airfoil element to which the airfoil element protection device is bonded thereto;
wherein the complex is built as an adhesive standalone foil to be bonded on the airfoil element, said foil being formed in counter-relief to fit a profile of a leading edge of the airfoil element comprising areas of low incidence and areas of high incidence, the polymer film being shaped to cover one or more areas of low incidence of the airfoil element, the metal strip being shaped to cover only an area of high incidence of the airfoil element so that the metal strip is disposed between polymer strips,
wherein the polymer film has a thickness between 50 and 350 µm, and wherein the metal strip has a thickness between 20 and 150 µm.

2. The airfoil element protection device according to claim 1, wherein the metal strip is bonded to the polymer film.

3. The airfoil element protection device according to claim 1, wherein the metal strip is welded to the polymer film.

4. The airfoil element protection device according to claim 1, wherein the metal strip is embedded in the polymer film.

5. The airfoil element protection device according to claim 4, wherein the metal strip is embedded by hot application to the polymer film.

6. The airfoil element protection device according to claim 1, wherein the metal strip comprises a base configured to be bonded to the airfoil element, sheets of the polymer film being positioned on either side of the metal strip.

7. The airfoil element protection device according to claim 1, wherein the polymer film comprises a lower sheet on which the metal strip is laid and two upper sheets joined together with the lower sheet on either side of the metal strip.

8. The airfoil element protection device according to claim 2, further comprising a sealing varnish covering an interface area between the metal strip and the polymer film.

9. The airfoil element protection device according to claim 1, wherein edges of the metal strip extended by the polymer film are bevelled edges.

10. The airfoil element protection system comprising the airfoil element device according to claim 1 accompanied by an assembly jig and forms, with this jig, a kit that can be adapted outside of a factory.

11. The airfoil element covered with the airfoil element protection device as claimed in claim 1, wherein the metal strip covers the leading edge of the airfoil element and the polymer film covers a lower surface portion and an upper surface portion of the airfoil element around the leading edge.

12. A helicopter blade covered with the airfoil element protection device according to claim 1, wherein the metal strip covers the leading edge of the helicopter blade and the polymer film covers a lower surface portion and an upper surface portion of the helicopter blade around the leading edge.

13. The airfoil element protection device according to claim 1, wherein the adhesive element has a thickness of approximately 50 µm.

14. The airfoil element protection device according to claim 1, wherein the thickness of the polymer film is between 50 and 300 µm.

15. The airfoil element protection device according to claim 1, wherein the thickness of the metal strip is between 20 and 100 µm.

16. The airfoil element protection device according to claim 1, wherein the metal strip has a width between 2 to 10 cm.

17. The airfoil element protection device according to claim 16, wherein the width of the metal strip on a root side is greater than the width of the metal strip on a blade tip side.

18. The airfoil element protection device according to claim 16, wherein a width of the polymer film on a root side is greater than the width of the polymer film on a blade tip side.

19. An airfoil element protection device, comprising:
a complex comprising a polymer film, a metal strip deposited on a portion of the polymer film, and an adhesive element to bond the polymer film to an airfoil element,
wherein the polymer film forms a protection against sand erosion and the metal strip forms a protection against water erosion of the airfoil element to which the airfoil element protection device is bonded thereto;
wherein the complex is built as an adhesive standalone foil to be bonded on the airfoil element,
said foil being formed in counter-relief to fit a profile of a leading edge of the airfoil element comprising areas of low incidence and an area of high incidence,
the polymer film being shaped to cover one or more areas of low incidence of the airfoil element,
the metal strip only covering the area of high incidence of the airfoil element so that the metal strip is disposed between polymer strips.

20. The airfoil element protection device of claim 19 wherein the metal strip has a width between 2 to 10 cm.

* * * * *